United States Patent [19]

Kubo et al.

[11] 3,731,228

[45] May 1, 1973

[54] OSCILLATING CIRCUIT

[75] Inventors: Noriyoshi Kubo; Kazuhiro Nakamura; Yoshinori Endo, all of Yokohama; Takeshi Katano; Eisuke Ichinohe, both of Osaka, all of Japan

[73] Assignee: Matsushita Electric Industrial Co., Ltd., Osaka, Japan

[22] Filed: Sept. 16, 1971

[21] Appl. No.: 181,034

[30] Foreign Application Priority Data

Sept. 18, 1970 Japan ....................................45/82356

[52] U.S. Cl. ....................................331/111, 307/290

[51] Int. Cl. ....................................H03k 3/295

[58] Field of Search ........................331/111; 307/290

[56] References Cited

UNITED STATES PATENTS 3,289,103 11/1966 Campman ............................331/111

*Primary Examiner*—John Kominski

*Attorney*—Stevens, Davis, Miller & Mosher

[57] ABSTRACT

An oscillating circuit comprising a Schmitt circuit, a grounded capacitor connected to the input side of the Schmitt circuit and a control circuit connected to the output side of the Schmitt circuit for controlling the charging and discharging of the capacitor.

1 Claim, 3 Drawing Figures

OSCILLATING CIRCUIT

FIELD OF THE INVENTION

This invention relates to oscillating circuits and, more particularly, an oscillating circuit using a Schmitt circuit which may be readily integrated into a semiconductor integrated circuit and may be made to serve as a variable oscillator.

SUMMARY OF THE INVENTION

An object of the invention is to provide an oscillating circuit comprising a Schmitt circuit, a grounded capacitor connected to the input side of the Schmitt circuit and a transistor control circuit connected to the output side of the Schmitt circuit for controlling the charging and discharging of the grounded capacitor.

DESCRIPTION OF THE PREFERRED EMBODIMENT

Figure 1:
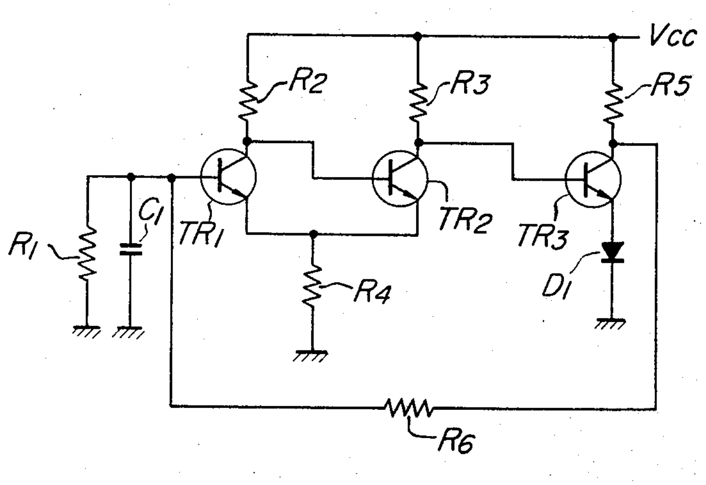
FIG. 1 is a circuit diagram showing an embodiment of the oscillating circuit according to the invention.

FIG. 1 shows a preferred embodiment of the oscillating circuit according to the invention. It uses a Schmitt circuit including transistors $TR_1$, and $TR_2$ and resistors $R_2$, $R_3$ and $R_5$. A grounded capacitor $C_1$ is connected to the input side of the Schmitt circuit. The charging and discharging of the capacitor $C_1$ is controlled through a circuit consisting of a transistor $TR_3$, resistors $R_5$ and $R_6$ and a diode $D_1$. It is discharged through a discharging resistor $R_1$. The resistor $R_2$, $R_3$ and $R_5$ are connected to a power supply $V_{cc}$.

In the operation of the circuit described above, when the transistors $TR_1$, $TR_2$ and $TR_3$ are respectively off, on and off, the capacitor $C_1$ is charged through the loop of power source $V_{cc}$, resistors 5 and 6 and capacitor $C_1$. At this time, the voltage drop V across the resistor $R_4$ is $$V=R_4/(R_4+R_3)\cdot V_{cc},$$

(ignoring the saturation voltage of the transistor $TR_3$). Thus, the terminal voltage across the capacitor $C_1$ reaches a predetermined value given as $$V_c=R_4/(R_4+R_3)\cdot V_{cc}+V_{BE} \qquad (1)$$

(where $V_{BE}$ is the potential difference between the base and emitter of the transistor $TR_2$). As soon as this predetermined terminal voltage across the capacitor $C_1$ is reached, the transistor $TR_1$ is triggered. At this instant, $$V_c \geqq R_4/(R_4+R_3)\cdot V_{cc}+0.6\ V \qquad (2)$$

(where 0.6 $V$ represents the potential difference between the base and emitter of the transistor $TR_1$). Also, for the base voltage on the transistor $TR_1$ at this instant $$R_4/(R_2+R_4)\,(V_{cc}-V_{CE})-V_{BE} \geqq V_c \qquad (3)$$

(where $V_{CE}$ is the potential difference between the collector and emitter of the transistor $TR_1$ and equal to the base-emitter voltage thereof). Upon triggering of the transistor $TR_1$, the transistor $TR_2$ is cut off to trigger the transistor $TR_3$.

At this time, if $Z_1 < Z_2 < Z_3$ where $Z_1$ is the impedance provided by resistor $R_6$, transistor $TR_3$ and diode $D_1$, $Z_2$ is the impedance provided by resistor $R_1$, and $Z_3$ is the impedance provided by transistor $TR_1$ and resistor $R_4$, the capacitor $C_1$ is discharged through a loop of resistor $R_6$, transistor $TR_3$ and diode $D_1$ and through another loop of resistor $R_1$.

As soon as the terminal voltage of the capacitor $C_1$ being discharged is reduced to a certain prescribed level, the transistor $TR_1$ is cut off, triggering the transistor $TR_2$ to cut off the transistor $TR_3$. As a result, re-charging of the capacitor $C_1$ starts.

Figure 2:
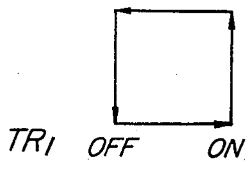
FIG. 2 shows a hysteresis character of the oscillation of the circuit of FIG. 1.

If the resistance of the resistor $R_2$ is equal to the resistance of the resistor $R_3$, the charging and discharging of the capacitor $C_1$ take the same period. However, if the former resistance is selected to be greater than the latter resistance, the base potential of the transistor $TR_1$ at the instant of its triggering is different from the level at the instant of its cut-off. Thus, the oscillation involves a hysteresis decay as shown in FIG. 2.

Figure 3:
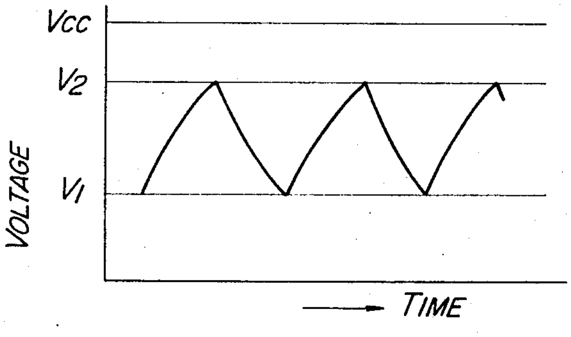
FIG. 3 is a graph showing the terminal voltage across the charging and discharging capacitor.

In this case, the capacitor $C_1$ is charged and discharged in a manner as shown in FIG. 3. In the Figure, $V_1$ and $V_2$ represent respective minimum and maximum levels of the terminal voltage across the capacitor $C_1$, and from equations 2 and 3

$$V_1=R_4/(R_2+R_4)\cdot(V_{cc}-V_{BE}) \qquad (4)$$

and $$V_2=R_4/(R_2+R_4)\cdot V_{cc}+V_{BE} \qquad (5)$$

The resistor $R_1$ serves to stabilize the discharging of the capacitor $C_1$ and hence the oscillation of the oscillating circuit according to the invention. Without the resistor $R_1$, the discharging of the capacitor $C_1$ through the path of resistor $R_6$, transistor $TR_3$ and diode $D_1$ is likely to be suddenly subjected to very unstable conditions.

As has been described, according to the invention a hysteresis character is imparted to the operation of the Schmitt circuit for on-off controlling the control transistor $TR_3$ controlling the charging and discharging of the capacitor $C_1$, so that reliable oscillation can be ensured. Also, all the components parts which are relatively small in number may be readily integrated into a semiconductor integrated circuit except for the capacitor $C_1$. Further the oscillation frequency may be readily made variable by using a variable capacitor for the capacitor $C_1$.

We claim:

1. An oscillating circuit comprising
   - a Schmitt circuit including a pair of transistors connected in cascade,
   - a capacitor connected between the input of said Schmitt circuit and ground,
   - a control transistor coupled to the output of said Schmitt circuit for controlling the charging and discharging of said capacitor, the on-off operation of said control transistor being controlled by the output of said Schmitt circuit,
   - connecting circuit means connected between said capacitor and said control transistor, said connecting circuit means being a portion of a charging circuit and also a portion of a first discharge circuit,
   - a second discharge circuit for said capacitor including a resistor connected in parallel with said capacitor, and a diode connected in series with said control transistor, said connecting circuit means, control transistor and diode comprising said first discharge path, said first discharge path having a low impedance with respect to the impedance of said second discharge circuit.

* * * * *

UNITED STATES PATENT OFFICE
CERTIFICATE OF CORRECTION

Patent No. 3,731,228 Dated May 1, 1973

Inventor(s) Noriyoshi Kubo et al

It is certified that error appears in the above-identified patent and that said Letters Patent are hereby corrected as shown below:

Col. 2, line 31, formula should read:

$$V_2 = R_4/(R_3 + R_4)\ V_{CC} + V_{BE}$$

Signed and sealed this 27th day of November 1973.

(SEAL)
Attest:

EDWARD M.FLETCHER,JR.
Attesting Officer

RENE D. TEGTMEYER
Acting Commissioner of Patents